(12) United States Patent
Cossard et al.

(10) Patent No.: US 8,893,245 B2
(45) Date of Patent: Nov. 18, 2014

(54) METHOD AND DEVICE FOR PROPAGATING SESSION MANAGEMENT EVENTS (75) Inventors: David Cossard, Vauréal (FR); Gérard Dedieu, Montigny le Bretonneux (FR)

(73) Assignee: Evidian, Les Clayes sous Bois (FR)

( * ) Notice: Subject to any disclaimer, the term of this patent is extended or adjusted under 35 U.S.C. 154(b) by 0 days.

(21) Appl. No.: 13/579,066

(22) PCT Filed: Feb. 4, 2011

(86) PCT No.: PCT/FR2011/050229
§ 371 (c)(1),
(2), (4) Date: Oct. 17, 2012

(87) PCT Pub. No.: WO2011/101573
PCT Pub. Date: Aug. 25, 2011

(65) Prior Publication Data
US 2013/0047234 A1 Feb. 21, 2013

(30) Foreign Application Priority Data

Feb. 17, 2010 (FR) ...................................... 10 51143

(51) Int. Cl.
*H04L 29/00* (2006.01)
*H04L 29/06* (2006.01)
(52) U.S. Cl.
CPC ...................................... *H04L 63/20* (2013.01)
USPC ................................................ 726/7; 726/20
(58) Field of Classification Search
USPC .......................................................... 726/20
See application file for complete search history.

(56) References Cited

U.S. PATENT DOCUMENTS

| 6,546,419 | B1 | 4/2003 | Humpleman et al. | |
| 6,889,321 | B1 | 5/2005 | Kung et al. | |
| 2003/0229900 | A1 | 12/2003 | Reisman | |
| 2004/0098446 | A1* | 5/2004 | Styles et al. | 709/200 |
| 2005/0193118 | A1* | 9/2005 | Le et al. | 709/227 |

OTHER PUBLICATIONS

International Search Report as issued for PCT/FR2011/050229.

* cited by examiner

*Primary Examiner* — Ghazal Shehni
(74) *Attorney, Agent, or Firm* — Pillsbury Winthrop Shaw Pittman LLP (57) ABSTRACT A method for propagating session management events between a plurality of machines forming a machine cluster includes generating, with a session management user interface, a session management event on a first machine of the machine cluster; detecting, with an installment of the interface, the generated event; sending, from the installment to a first security service related to the first machine, a set of specific information that is related to the detected event; determining, with the first security service, a set of target machines; sending the specific information from the first security service to target security services that are related to the target machines; and processing the specific information at each target security service of the target machines so as to execute, on each target machine that has received the specific information, the session management event generated on the first machine.

20 Claims, 3 Drawing Sheets

METHOD AND DEVICE FOR PROPAGATING SESSION MANAGEMENT EVENTS

CROSS REFERENCE TO RELATED APPLICATIONS

This application is the U.S. National Stage of PCT/FR2011/050229, filed Feb. 4, 2011, which in turn claims priority to French Patent Application No. 1051143, filed Feb. 17, 2010, the entire contents of all applications are incorporated herein by reference in their entireties.

TECHNICAL FIELD OF THE INVENTION

The object of the present invention is a method for propagating session management events. Another object of the invention is a device capable of implementing a method for propagating session management events. The main purpose of the present invention is to facilitate the taking into account of session management events for a user using a plurality of machines, while ensuring optimal security in terms of the control of users of different machines under consideration.

In general, the field of the invention is that of the simultaneous use of several machines by a same user. The machines under consideration are mainly of the work station, server and router type. In various situations, particularly in different professional contexts, a same user is led to work simultaneously on several machines. This is the case, for example, with traders, who typically have between four and six machines available in their immediate environment—the various machines being immediately accessible from their position of work, particularly their office. The operations carried out on the set of machines are visible on different screens visible to the user.

TECHNOLOGICAL BACKGROUND OF THE INVENTION

When a user of several machines wishes to operate all of the machines on which he wants to work, he inevitably must identify himself on each machine through a session management user interface. Different possibilities, corresponding to different levels of security and to different levels of user traceability, are offered to a user to identify himself on the machines on which he wishes to work.

The least secured of these possibilities resides in the inputting of an identifier and a password into the session management user interface. A more secured solution, enabling better identification of the user, resides in the use of a smart card belonging to the user; the smart card is inserted into a specific reader and the session management user interface then invites the user to enter a PIN code to be identified. An even more secured solution ensuring even better user traceability (smart cards may be stolen or loaned), resides in the use of biometric systems: The user is identified by means, for example, of a fingerprint.

If improvements therefore occurred in terms of securing access to machines and user traceability, a problem with the ease of identification of users remains. In fact, regardless of the type of identification operation (entering an identifier and password, using a smart card or a biometric system), it is necessary for the user to carry out the identification operation on all of the stations that he wishes to use. As these identification operations occur at least on a daily basis, their repeated character quickly becomes tiresome to the user and unnecessarily wastes time. In addition, the use of smart cards and/or biometric systems may necessitate the installation of specific readers or sensors on each of the machines intended to be used by the user. This tiresome character connected to the identification operations is also found for other operations executed by means of the session management user interface; this is particularly the case for session locking operations, session closing operations or else session reinitializing (rebooting) operations.

GENERAL DESCRIPTION OF THE INVENTION

The method and device according to the invention propose a solution to the problems that have just been stated. In the invention, a solution is proposed so that a user of a plurality of machines does not have to repeat certain session management operations: Thanks to the invention, he only has to execute an operation once on a first station so that the operation in question is considered to be performed on all of the other stations on which the user is led to work. For example, the operation may be an identification operation, a session closing operation, a session locking operation or else an operation to reboot one or more machines.

Advantageously, in the invention, a significant degree of securement is brought to these operations, and user traceability is ensured in an optimal manner, in respectively limiting access to machines to authorized users and in possibly retaining information relative to the identity of the user. For this purpose, the invention particularly provides for defining all of the machines that are capable of communicating between each other so that the session management events executed at the level of a first machine propagate to the other machines of the plurality of machines under consideration.

The invention therefore mainly relates to a method for propagating session management events between a plurality of machines forming a machine cluster, characterized in that the method comprises the following various steps:
  generating, by means of a session management user interface, a session management event on a first machine from the machine cluster;
  detecting, by means of a plugin of the session management user interface of the first machine, the generated event;
  transmitting, from the plugin of the session management user interface of the first machine to a first security service, associated with the first machine, a set of specific information associated with the detected event;
  determining by means of the first security service a set of target machines, each of the target machines being associated with a target security service that is specific to it; the target machines determined are machines constituting the machine cluster to which the first machine belongs;
  transmitting specific information from the first security service to target security services associated with the target machines;
  processing the specific information, at each target security service of the target machines that have received said specific information to execute, on each target machine that has received said specific information, the session management event generated on the first machine in the machine cluster.

Machine is understood to refer to any computer equipment comprising a session management user interface by which a user may be authenticated with an identifier and a password. In the non-limiting examples, a machine may be an individual workstation or a server.

Security service is understood to refer to a background task that operates independently from a user session, i.e., even in the absence of a user session. Therefore, a security service, due to its independence with regard to a user session, may continue to operate even when a session management user interface, used on the machine associated with the security service under consideration, is no longer active, such as is the case with some operating systems.

Management event is understood to refer to one of four operations realizable by means of a session management user interface, i.e., an identification operation—particularly in view of a work session opening, a session closing operation, a session locking operation and a rebooting operation. A session locking operation is distinguished from a session closing operation insofar as for a session locking operation, the session remains open and active, the applications operating continue their tasks, but no user may intervene via the locked man machine interface. On the other hand, following a session closing operation, the session is stopped, all the applications that were being executed were stopped; the user is then disconnected and the session in progress is destroyed.

The method according to the invention may comprise, in addition to the main steps that have just been mentioned in the previous paragraph, one or more additional characteristics from among the following:

the step of transmitting specific information from the first security service to the target security services associated with the target machines is carried out repeatedly, particularly in a periodic manner.

the step of transmitting specific information from the first security service to the specific security services associated with the target machines is carried out after encrypting the specific information.

the step of determining the set of target machines from among the machines in the machine cluster is carried out by means of a directory accessible by the security service, said directory comprising the list of all of the machines in the cluster.

the method comprises the additional step consisting of modifying the machine cluster by a directory updating operation.

the method comprises the additional step consisting of, for each inactive machine in the machine cluster that had not received a signal from another machine in the cluster during a previously determined duration, causing a session closing or a locking of said machine under consideration.

the transmission, from the plugin of the session management user interface to the first security service, is carried out according to a TCP/IP type protocol or any other client/server type protocol.

the step of transmitting specific information from the first security service to the target security services associated with the target machines is carried out according to a TCP/IP type protocol or any other client/server type protocol.

the event generated is an authentication or unlocking event, following the generation by a user of an identifier and a password, said method then comprising the following different steps:

verifying, by means of the session management interface, an agreement between the identity and the password;

if the agreement between the identity and the password is proven, proceeding, by means of the plugin of the session management user interface from the first machine, with detecting the generated event;

transmitting, from the plugin of the session management user interface from the first machine to the first security service, associated with the first machine, all of the specific information comprising at least the identity and the password generated by the user.

the step of executing on each target machine the authentication event comprises, for each target machine that had received all of the specific information, the following different steps:

transmitting, from the target security service of the target machine under consideration, a notification to open or unlock the session management user interface of said target machine under consideration;

transmitting, from a plugin of the session management user interface of the target machine under consideration, to the target security service of the target machine under consideration, a TCP/IP request or a request according to an equivalent protocol;

communicating from the security service to the plugin of the target machine under consideration, according to the TCP/IP protocol or according to an equivalent protocol, the identification information and the password;

opening, or unlocking, a work session on the target machine under consideration.

the event generated is a session locking or session closing event, following the generation by a user of a, respectively, locking or closing command, the step of processing specific information at the level of each target security service of the target machines then comprising the following different steps:

transmitting, from the target security service of each target machine under consideration, a notification to lock or close a work session previously opened on the machine under consideration;

locking or closing the machine under consideration.

the event generated is a session rebooting event,

Following the generation by a user of a rebooting command, the step of processing specific information at the level of each target security service of the target machines then comprising the operation consisting of executing a rebooting application for each target machine having received the specific information associated with the rebooting event.

the method comprises the additional step, prior to the step of transmitting, from the plugin of the session management user interface of the first machine to the first security service, all of the specific information associated with the rebooting event, consisting of selecting a rebooting mode, said rebooting mode being either local or general; if the local mode is selected, only the first machine is rebooted; If the general mode is selected, all of the machines from the machine cluster are rebooted.

the method comprises, to execute a secured application on the target machine, the additional steps consisting of, the first machine being equipped with secured identification tools:

carrying out an identification operation on the first machine by means of secured identification tools;

in the case of a validated identification, transmitting a validation message from the first machine to the second machine, said validation message authorizing the opening of the secured application.

the identification tools being of the smart card/smart card reader type, the method comprises the different steps consisting of, prior to the identification operation on the first machine:

entering a PIN code on the second machine;

transmitting the PIN code from the second machine to the first machine.

the identification tools being of the biometric sensor type, the method comprises the step consisting of, prior to the identification operation on the first machine, opening a dialog box on the second machine inviting a user to identify himself on the first machine.

The different additional characteristics of the method according to the invention, insofar as they are not mutually exclusive, are combined according to all combination possibilities to result in different examples of embodiment of the invention.

The invention also extends to a set of machines capable of implementing the method according to the invention, the different machines being equipped with any means necessary to carry out the different operations necessary for implementing the method according to the invention.

The invention and its various applications will be better understood upon reading the following description and examining the accompanying figures.

BRIEF DESCRIPTION OF THE FIGURES

The figures are presented for indicative purposes and in no way limit the invention. The figures show.

DESCRIPTION OF PREFERRED FORMS OF EMBODIMENT OF THE INVENTION

Unless stated otherwise, elements appearing in different figures will keep the same references.

Figure 1:
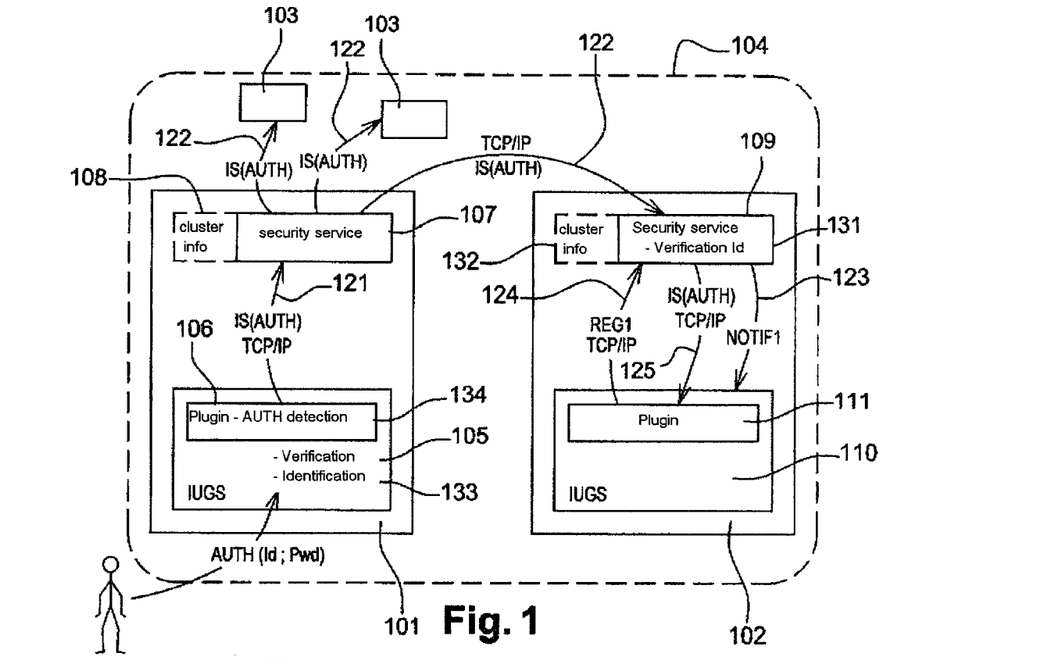
FIG. 1 is a schematic representation of an example of an embodiment of the method according to the invention with an authentication type session management event.

FIG. 1 schematically represents a first example of embodiment of the method according to the invention. In this figure, a first machine 101, a second machine 102 and various other machines 103. The set of machines represented constitute a machine cluster 104. Typically, a machine cluster is constituted of four to six machines; But in certain applications of the invention, for example when the machines under consideration constitute a cluster of machines placed throughout a store in which various customer assistant stations are distributed over the area of the store, the machine cluster may be constituted of higher number of machines.

In the example from FIG. 1, as in the other examples that will be detailed by means of the other figures, only the operations from the first machine 101 and from the second machine 102 are detailed; The operation of the other machines 103 from cluster 104 being similar to the operation of the second machine 102. In their operation for the embodiment of the method according to the invention, the first machine 101 is distinguished from the other machines in cluster 104 by designating these other machines as target machines.

The first machine 101 is distinguished from the other machines in cluster 104 and particularly from the target machine 102, insofar as it is this machine that generates, particularly by a user, a session management event via a session management user interface 105 (name abbreviated by the acronym IUGS), sometimes simply designated user interface. But in the context of the embodiment of the method according to the invention, the operation of various machines in the cluster is completely interchangeable: The target machine 102 may absolutely be used as the first machine 101 when the session management event is directly (i.e., not through another machine in the cluster) generated by a user on said target machine 102. In such a case, the first machine 101 then becomes one of the target machines in the machine cluster 104.

In the example illustrated by means of FIG. 1, the event under consideration is a user authentication—or identification—type AUTH event. The operation that will be described is similar to the case where the event under consideration is of the session unlocking type. The user generates such an identification, or unlocking, event, either by direct entry on a keyboard associated with the first machine of an identifier Id and a password Pwd, or by a hardware interface, for example of the smart card reader or biometric sensor type; In all cases, the step of generating the identification or unlocking type session management event leads to the generation of the identifier Id and password Pwd, these two pieces of data, when they are not entered manually, being associated in a cross reference table, not represented, stored in the first machine with a smart card or biometric information associated with a user.

An operation to verify 133 the agreement between the identifier and the password is then carried out by the user interface 105 in a following step. If the agreement is correct, a plugin 106 of the user interface 105 detects said management event and recovers specific information IS associated with the event detected. In the first example illustrated, the specific information IS(AUTH) comprise at least the identifier Id and the password Pwd. In other examples that will be detailed subsequently, the specific information advantageously comprise a command capable of intervening on a session management user interface. Plugin 106 then carries out a transmission 121 of specific information IS(AUTH) to a first security service 107 associated with the first machine 101. The transmission 121 is carried out by respecting a TCP/IP type protocol, or any other protocol of the equivalent client/server type, for example of the UDP or other type, such as for example SPX or TCAP.

The security service 107 then accesses a directory 108 in which it reads the identity of the target machines from the machine cluster. Directory 108 advantageously comprises, for each machine referenced, at least one of the following pieces of information: Globally Unique Identifier, a name, assigned for example by an administrator, and its IP address. Advantageously, directory 108 comprises, for each machine referenced, these three pieces of information. The first security service 107 then transmits 122 specific information IS(AUTH) to the target machines. This transmission is also carried out according to a protocol of the TCP/IP type or any other equivalent protocol of the client/server type. Advantageously, prior to this transmission, as in the other examples that will be described subsequently, the specific information transmitted will be encrypted as a security measure.

Each target machine, insofar as it is connected to the network constituted by the machine cluster 104, the connection may be of any type whatsoever, receives specific information IS at the level of a security service 109 that is specific to it, designated for each target machine by the expression target security service. If the specific information IS(AUTH) had been encrypted previously, it is decrypted.

In this example, as in the other examples of embodiment that will be described subsequently, if a target machine in the machine cluster 104 does not receive the specific information, for example because it is not connected to the first machine 101, it will receive said specific information once the connection will be reestablished. For this purpose, it is provided that the first security service 107 periodically sends specific information to all of the target machines in the machine cluster 104.

Once the specific information IS(AUTH) is received by the target machines, particularly by target machine 102, the target security service 109 associated with each of the target machines carries out a belongingness verification operation 131 of the machine from which the specific information is received at the machine cluster 104. For this purpose, the security service 109 accesses a directory 132 identifying all of the machines in the machine cluster 104. Therefore, the directory 132 advantageously comprises, for each machine referenced, at least one of the following pieces of information: Globally Unique Identifier, a name, assigned for example by an administrator and its IP address. Advantageously, directory 132 comprises, for each machine referenced, these three pieces of information. Such verification enables protection against messages sent erroneously or maliciously to a target machine in the machine cluster 104 from a non-authorized machine. This step of the method is advantageously reproduced in the different embodiments of the method according to the invention that will be described subsequently.

Once verification has been carried out, the security service 109 transmits 123 a notification NOTIF1 to request a session opening or unlocking.

In general, a notification is an application-oriented message that is defined according to the session management user interface of the machine in which the notification under consideration is transmitted. Therefore, for example, in the case of a Windows™ session management user interface, a notification is an event generated by Windows™. In another example, in the case of a Linux™ session management user interface, a notification is an event generated by Linux™.

The notification NOTIF1 transmitted causes a session management target user interface 110 to be opened. A plugin 111, called the target plugin, of the session management target user interface 110 then transmits 124 a request REQ1 of the TCP/IP type, or operating according to any equivalent protocol of the client/server type, to the target security service 109 to cause specific information IS(AUTH), and particularly the identifier Id and the password Pwd, to be sent 125 from the target security service 109 to the target plugin 111.

A work session is therefore opened or unlocked on the target machine 102, and on any other machine 103 in the machine cluster 104 having effectively received the specific information IS(AUTH).

The example that has just been described mentions the use of directories 108 and 132 that determine the machines that belong to a cluster under consideration. These directories are accessible by the security services of the machines. In general in the different examples of embodiment of the method according to the invention, these directories are either stored in each of the machines, possibly after having been transmitted by a remote management entity, or are stored in a remote management entity, the security services then accessing said management entity to consult the directories. In this second possibility, it may be considered that a single directory exists for a cluster of machines. Advantageously, a user of a machine from a given machine cluster may change the directory by adding, or possibly removing, certain machines to or from the cluster to which the machine that he uses belongs. For this purpose, the user accesses the directory stored in the remote management unit and modifies the list of machines in the cluster, advantageously according to the rights that have been previously granted to the user; For example, the user may only add machines appearing in a list of available machines to a machine cluster.

In an improvement of the method according to the invention, it is provided that, for each inactive machine in the machine cluster 104 that had not received a signal from another machine in the machine cluster 104 during a previously determined duration, a session closing or a session locking of the work session in progress on said machine under consideration is caused. Inactive machine is understood to refer to a machine on which the user does not directly intervene through the conventional man-machine interface (keyboard, mouse, etc.). For this purpose, the use of a countdown in each machine is provided that measures a duration of inactivity of the machine under consideration, the countdown being reinitialized once the machine under consideration receives information from another machine in the machine cluster, or once the user directly uses the machine under consideration.

Figure 2:
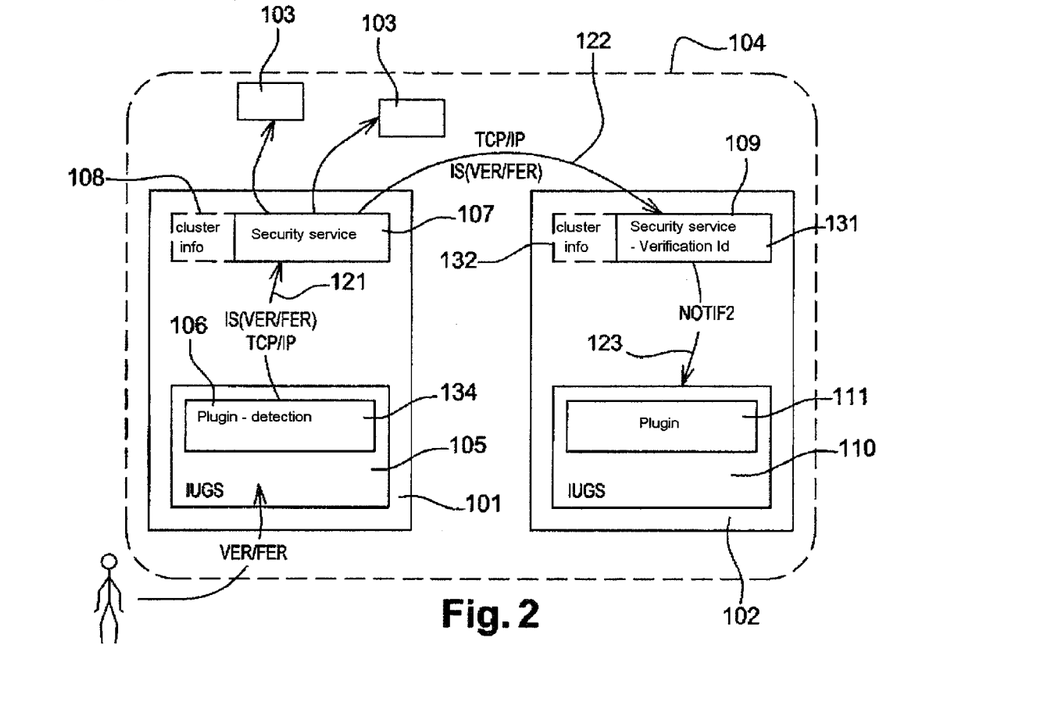
FIG. 2 schematically represents an example of an embodiment of the method according to the invention with a session locking or session closing type session management event.

FIG. 2 schematically represents a second example of embodiment of the method according to the invention. In this example, the event under consideration is a user session locking event VER, or a user session closing event FER. The user generates such a locking or closing event by using the session management user interface 105.

The plugin 106 of the user interface 105 also detects 134 said locking or closing event, and recovers specific information IS(VER/FER) associated with the detected event. In the second example illustrated, the specific information comprises at least one session locking or closing command instruction. The plugin 106 then transmits specific information IS(VER/FER) to the first security service 107 associated with the first machine 101. The transmission 121 is carried out by respecting a protocol of the TCP/IP type, or any other equivalent protocol of the client/server type.

The security service 107 then accesses the directory 108 in which it reads the identity of the target machines in the machine cluster 104. The first security service 107 then transmits 122 specific information IS(VER/FER) to the target machines. The transmission 122 is also carried out according to a protocol of the TCP/IP type or any other equivalent protocol of the client/server type.

Each target machine, insofar as it is connected to the network constituted by the machine cluster 104, the connection may be of any type whatsoever, receives specific information IS(VER/FER) at the level of a security service 109 that is specific to it.

Once the specific information IS(VER/FER) is received by the target machines, particularly by the target machine 102, the target security service 109 associated with each of the target machines transmits 123 a notification NOTIF2 to request a session locking or closing. The transmission 123 is advantageously preceded by the belongingness verification operation 131 of the machine from which the specific information is received at the machine cluster 104.

The notification NOTIF2 is then transmitted either to the plugin 111 of the session management target user interface 110 if present (as is the case for example with Windows XP™ or Linux™ operating systems), as illustrated in FIG. 2, or to a specific application capable of causing the closing or locking of the work session (as is the case for example with the Windows Vista™ operating system).

The work session is thus locked or closed.

Figure 3:
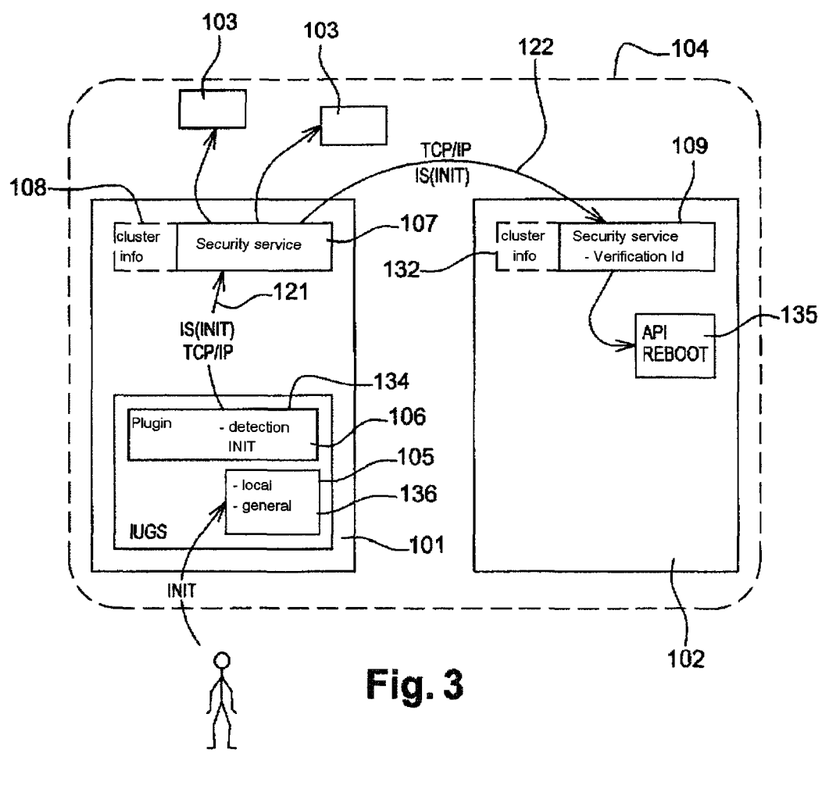
FIG. 3 is a schematic representation of an example of embodiment of the method according to the invention with a rebooting type session management event.

FIG. 3 schematically represents a third example of embodiment of the method according to the invention. In this example, the event under consideration is a user session rebooting event INIT. The user generates such a rebooting event by using the session management user interface 105.

Advantageously, in the invention, it is provided that the session management user interface receiving the rebooting event INIT proposes to the user, by activating an application 136, a choice between a local rebooting operation or a general rebooting operation. In the first case, only the first machine is rebooted. In the second case, the rebooting event is intended to propagate, according to the invention, to all of the target machines in the machine cluster 104 as described below.

Therefore, if the general rebooting mode is chosen by the user, the plugin 106 of the user interface 105 also carries out detection 134 of said rebooting or closing event, and recovers specific information IS(INIT) associated with the event detected.

In the third example illustrated, the specific information comprises at least one session rebooting command instruction. The plugin 106 then transmits specific information IS(INIT) to the first security service 107 associated with the first machine 101. The transmission 121 is carried out by respecting a protocol of the TCP/IP type, or any other equivalent protocol of the client/server type.

The security service 107 then accesses the directory 108 in which it reads the identity of the target machines in the machine cluster 104. The first security service 107 then transmits 122 specific information IS(INIT) to the target machines. The transmission 122 is also carried out according to a protocol of the TCP/IP type or any other equivalent protocol of the client/server type.

Each target machine, insofar as it is connected to the network constituted by the machine cluster 104, the connection may be of any type whatsoever, receives specific information IS(INIT) at the level of a security service 109 that is specific to it.

Once the specific information IS(INIT) is received by the target machines, particularly target machine 102, the target security service 109 associated with each of the target machines executes a specific application programming interface, or API 135, within the target machine under consideration, said API, called API REBOOT, controlling the desired rebooting operation.

The execution of API 135 is advantageously preceded by the belongingness verification operation 131 of the machine from which the specific information is received at the machine cluster 104.

The work session is thus rebooted on each target machine that had executed API 135.

When a work session is opened on a machine, designated as the target machine, the session management interface, essentially from the authentication information (identifier and password) that it has, causes different applications, for example e-mail, To open. Some of these applications are secured applications and, while the authentication information has been sent to the session management user interface of the target machine, these secured applications require additional identification by again providing said authentication information.

One difficulty is then posed when one uses secured identification tools, of the smart card reader or biometric installation type, and these identification tools are installed on a first machine, capable of communicating with the target machine under consideration. In fact, the target machine under consideration does not have secured identification tools; their installation on the target machine under consideration would be very costly.

One solution to enable additional identification on the target machine without having to equip it with secured identification tools is to redirect the USB port. Such a redirection consists of remotely taking control of a USB peripheral device (such as for example a smart card reader). But such an operation leads to the local disconnection of the peripheral device and consequently to the closing or locking of the work session of the first machine, which is disabling, particularly in the case of the implementation of the method for propagating management events that has just been described.

Therefore, in the invention, a solution is proposed to carry out an additional identification procedure on a target machine so as to not close or lock the work session open on the first machine equipped with secured identification tools.

The solution proposed is advantageously implemented in the context of the propagation of management events that has been described until the present, particularly when the management event under consideration is an event. But more generally, it may also be implemented in a less sophisticated context, in which a first machine and a second machine are capable of exchanging information between each other. It is in this general context that the solution is described with reference to FIGS. 4 and 5.

Figure 4:
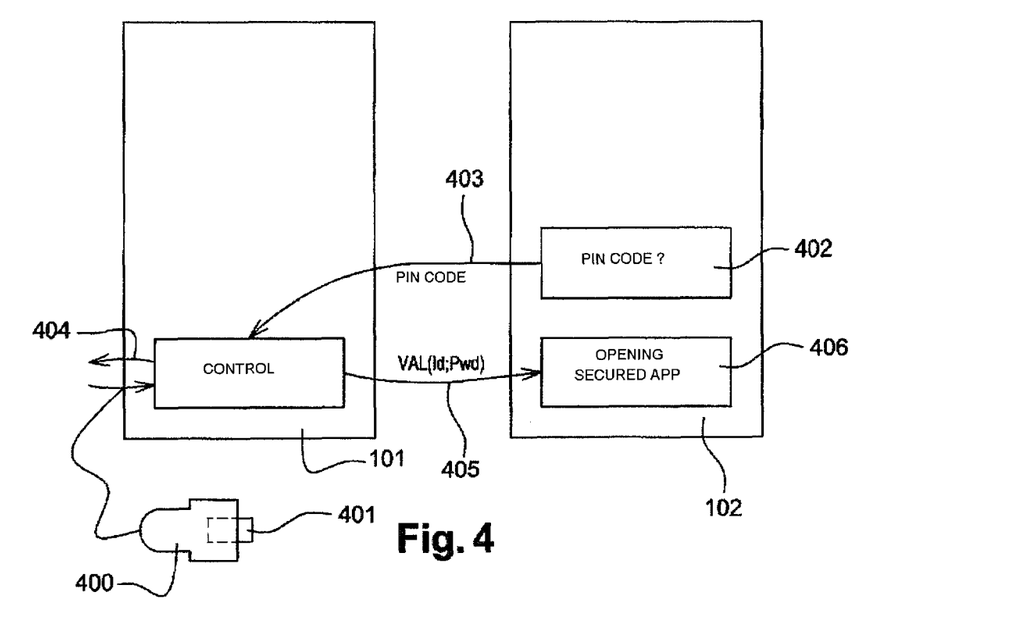
FIG. 4 schematically represents an example of embodiment of the method according to the invention in which the identification means are off center.
Figure 5:
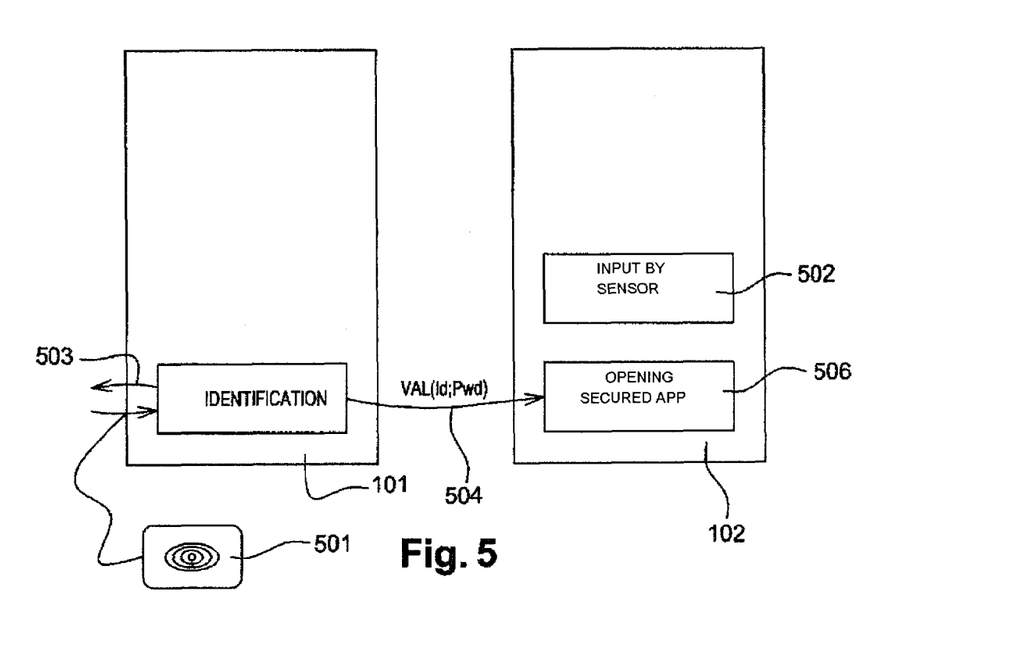
FIG. 5 schematically represents an example of embodiment of the invention in which the secured identification tools are of the biometric sensor type.

In these figures, a first machine and a target machine are represented. As represented in these figures, the first machine may for example, but not necessarily, be of the first machine 101 type, with, in particular, a plugin associated with the session management user interface, and a security service 107. The second machine may be for example, but not necessarily, of the target machine 102 type, with, in particular, the target security service 109.

The first machine is equipped with secured identification tools.

In FIG. 4, the secured identification tools are of the smart card 400 and associated smart card 401 card reader type. With such secured tools, when an additional identification request is requested at the level of the target machine 102 by a secured application 406, the target machine 102 including a work session that was previously opened following the receipt from the first machine 101, a dialog box 402 is opened in which a user is invited to enter a PIN code.

Once entered, the PIN code is transmitted 403 to the first machine 101. The transmission 403 is carried out according to a TCP/IP type protocol or any other client/server type protocol.

A control operation 404 is then implemented to verify the agreement between the PIN code entered and the PIN code of the smart card 401, by carrying out a dialog with said smart card 401. In case of agreement, a validation message VAL, advantageously comprising the identifier Id and the password Pwd necessary for opening the secured application, are sent to the target machine 402 by a transmission operation 405. The transmission is carried out according to a TCP/IP type protocol or any other client/server type protocol. The secured application 406 is then opened.

In FIG. 5, the secured identification tools are of the biometric sensor 501 type. With such secured tools, when an additional identification request is requested at the level of the target machine 102 to execute a secured application 506 on the target machine 102 in which a work session was previously opened following the receipt from the first machine 101, a dialog box 502 is opened in which the user is invited to intervene on the biometric sensor 501 connected to the first machine 101.

The user then uses the biometric sensor 501 connected to the first machine 101 to carry out an identification 503. Once the identification is made, a validation message VAL, advantageously comprising the identifier Id and the password Pwd necessary for opening the secured application under consideration on the target machine 102, is transmitted 504. Transmission 504 is carried out according to a TCP/IP type protocol or any other client/server type protocol.

In a first example of embodiment, the transmission 504 is carried out to all of the machines in a machine cluster to which the first machine 101 belongs. In this example of embodiment, it is provided, for example, that the first machine 101 accesses the directory 108 mentioned in the previous examples of embodiment. In a second example of embodiment, the transmission 504 is only carried out to the target machine 102. For this purpose, the target machine 102 previously transmitted identification information to the first machine 101, enabling transmission 504 to be delivered to it.

The secured application 506 is then opened on the target machine 102.

Such a mechanism therefore performs a secured identification at the level of the machines not equipped with secured identification tools, especially at the level of the machines belonging to a machine cluster such as defined in the context of the invention.

The invention claimed is:

1. A method for propagating session management events between a plurality of machines forming a machine cluster, the method comprising:
generating, with a session management user interface, a session management event on a first machine of the machine cluster;
detecting, with a plugin of the session management user interface of the first machine the generated event;
transmitting, from the plugin of the session management user interface of the first machine to a first security service, associated with the first machine, a set of specific information associated with the detected event, the first security service corresponding to a background program that operates in the first machine independently of a user session,
determining with the first security service a set of target machines, each target machine of the set of target machines being associated with a target security service that is specific to it the target machine;
transmitting the specific information from the first security service to target security services associated with the set of target machines;
processing the specific information, at each target security service of the set of target machines having received the specific information, to execute, on each target machine that has received the specific information, the session management event generated on the first machine in the machine cluster.

2. The method according to claim 1, wherein transmitting specific information from the first security service to the target security services associated with the set of target machines is carried out repeatedly.

3. The method according to claim 2, wherein transmitting specific information from the first security service to the target security services associated with the set of target machines is carried out in a periodic manner.

4. The method according to claim 1, wherein transmitting specific information from the first security service to the specific security services associated with the set of target machines is carried out after encrypting the specific information.

5. The method according to claim 1, wherein determining the set of target machines from among the machines in the machine cluster is carried out with a directory accessible by the first security service, the directory comprising a list of all of the machines in the machine cluster.

6. The method according to claim 5, comprising modifying the machine cluster by a directory updating operation.

7. The method according to claim 1, comprising, for each inactive machine in the machine cluster that had not received a signal from another machine in the cluster for a previously determined duration, causing a session closing or locking of the machine.

8. The method according to claim 1, wherein the transmission, from the plugin of the session management user interface to the first security service is carried out according to a TCP/IP type protocol or any other client/server type protocol.

9. The method according to claim 1, wherein transmitting specific information from the first security service to the target security services associated with the set of target machines is carried out according to a TCP/IP type protocol or any other client/server type protocol.

10. The method according to claim 1, wherein the event generated is an authentication or unlocking event, following the generation by a user of an identifier and a password, the method comprising:
verifying, with the session management user interface, an agreement between the identifier and the password;
if the agreement between the identifier and the password is proven, proceeding, with the plugin of the session management user interface from the first machine, with detecting the generated event;
transmitting, from the plugin of the session management user interface from the first machine to the first security service, associated with the first machine, all of the specific information comprising at least the identifier and the password generated by the user.

11. The method according to claim 10, wherein executing on each target machine the authentication or unlocking event comprises, for each target machine that had received all of the specific information:
transmitting, from the target security service of the target machine, a notification to open or unlock the session management user interface of the target machine;
transmitting, from a plugin of the session management user interface of the target machine, to the target security service of the target machine, a TCP/IP request or a request according to an equivalent protocol;
communicating from the security service to the plugin of the target machine, according to the TCP/IP protocol or according to an equivalent protocol, the identification information and the password;
opening, or unlocking, a work session on the target machine.

12. The method according to claim 1, wherein the generated event is a session locking or session closing event, following the generation by a user respectively of a locking or closing command, and wherein processing specific information at the level of each target security service of the set of target machines then comprising:
transmitting, from the target security service of each target machine, a notification to lock or close a work session previously opened on the machine;
locking or closing the machine.

13. The method according to claim 1, wherein the generated event is a session rebooting event, following the generation by a user of a rebooting command, and wherein processing specific information at the level of each target security service of the set of target machines then comprising executing a rebooting application for each target machine having received specific information associated with the rebooting event.

14. The method according to claim 13, comprising, prior to the transmission, from the plugin of the session management user interface of the first machine to the first security service, all of the specific information associated with the rebooting event, including selecting a rebooting mode, the rebooting mode being either local or general; if the local mode is selected, only the first machine is rebooted; if the general mode is selected, all of the machines from the machine cluster are rebooted.

15. The method according to claim 1 comprising, to execute a secured application on the target machine, the first machine being equipped with secured identification tools:
 carrying out an identification operation on the first machine with secured identification tools;
 in the case of a validated identification, transmitting a validation message from the first machine to the second machine, the validation message authorizing the opening of the secured application.

16. The method according to claim 15, wherein the identification tools are of the smart card/smart card reader type, the method comprising, prior to the identification operation on the first machine:
 entering a PIN code on the second machine;
 transmitting the PIN code from the second machine to the first machine.

17. The method according to claim 15, wherein the identification tools are of the biometric sensor type, the method comprising, prior to the identification operation on the first machine, opening a dialog box on the second machine, and inviting a user to identify himself on the first machine.

18. The method according to claim 1, wherein the first security service is adapted to access a directory to read an identity of the set of target machines.

19. The method according to claim 18, wherein the directory is stored in the first machine.

20. The method according to claim 18, wherein the directory is stored in a remote entity.

* * * * *